United States Patent
Jörgens et al.

(10) Patent No.: US 7,657,031 B2
(45) Date of Patent: Feb. 2, 2010

(54) METHOD AND DEVICE FOR PRINTING SENSITIVE DATA

(75) Inventors: Dieter Jörgens, Baldham (DE); Hartwig Schwier, München (DE)

(73) Assignee: Oce Printing Systems GmbH, Poing (DE)

(*) Notice: Subject to any disclaimer, the term of this patent is extended or adjusted under 35 U.S.C. 154(b) by 434 days.

(21) Appl. No.: 10/562,775

(22) PCT Filed: Jul. 16, 2004

(86) PCT No.: PCT/EP2004/007966

§ 371 (c)(1),
(2), (4) Date: Apr. 10, 2006

(87) PCT Pub. No.: WO2005/010733

PCT Pub. Date: Feb. 3, 2005

(65) Prior Publication Data

US 2006/0212926 A1    Sep. 21, 2006

(30) Foreign Application Priority Data

Jul. 18, 2003  (DE) ............... 103 32 850

(51) Int. Cl.
*G09C 3/00* (2006.01)
*H04K 1/00* (2006.01)
(52) U.S. Cl. .................. 380/55; 380/287
(58) Field of Classification Search .......... 380/55, 380/287
See application file for complete search history.

(56) References Cited

U.S. PATENT DOCUMENTS

| | | | |
|---|---|---|---|
| 5,606,613 A * | 2/1997 | Lee et al. | 705/62 |
| 5,633,932 A | 5/1997 | Davis et al. | |
| 6,502,240 B1 * | 12/2002 | Naclerio | 717/170 |
| 6,804,781 B1 * | 10/2004 | Castro | 713/193 |
| 7,308,572 B2 * | 12/2007 | Goh et al. | 713/152 |
| 7,308,717 B2 * | 12/2007 | Koved et al. | 726/27 |
| 2001/0037462 A1 | 11/2001 | Bengtson | |
| 2002/0032703 A1 | 3/2002 | Gassho et al. | |
| 2002/0184495 A1 | 12/2002 | Torii et al. | |
| 2003/0037248 A1 | 2/2003 | Launchbury et al. | |

(Continued)

FOREIGN PATENT DOCUMENTS

EP    0 114 522    8/1984

(Continued)

OTHER PUBLICATIONS

Das Druckerbuch Kapitel 4—Optische Zeichengeneratoren.

*Primary Examiner*—Techane J Gergiso
(74) *Attorney, Agent, or Firm*—Schiff Hardin LLP (57) ABSTRACT

In a method and system for printing of sensitive data, encrypted sensitive data to be printed is transferred to a printing device having a printing unit. This sensitive data to be printed is decrypted to create decrypted sensitive data. The decrypted sensitive data is converted into control signals for activation of the printing unit. The decrypted sensitive data is stored in a non-volatile memory such that the decrypted sensitive data are distributed in a plurality of memory segments of the non-volatile memory where a relationship of the memory segments is stored as relationship data independently of the stored decrypted sensitive data. The decrypted sensitive data is printed with the printing unit on a recording medium.

13 Claims, 5 Drawing Sheets

U.S. PATENT DOCUMENTS

| | | |
|---|---|---|
| 2003/0044009 A1 | 3/2003 | Dathathraya |
| 2003/0063749 A1* | 4/2003 | Revel et al. .................. 380/270 |
| 2003/0081775 A1* | 5/2003 | Campagna et al. ............ 380/46 |
| 2003/0084809 A1 | 5/2003 | Goh et al. |
| 2003/0101342 A1* | 5/2003 | Hansen ....................... 713/167 |
| 2003/0126451 A1 | 7/2003 | Gorobets |
| 2003/0154383 A9* | 8/2003 | Wiley et al. .................. 713/189 |
| 2003/0231767 A1* | 12/2003 | Carbajal ..................... 380/200 |
| 2004/0080772 A1* | 4/2004 | Snyders ..................... 358/1.14 |
| 2004/0225886 A1* | 11/2004 | Lahey et al. ................. 713/193 |

FOREIGN PATENT DOCUMENTS

| | | |
|---|---|---|
| EP | 0 617 383 | 9/1994 |
| EP | 0 858 021 | 8/1998 |
| EP | 1 091 275 | 4/2001 |
| EP | 1 091 285 | 4/2001 |
| EP | 1 320 029 | 6/2003 |
| WO | WO 00/55736 | 9/2000 |

* cited by examiner

METHOD AND DEVICE FOR PRINTING SENSITIVE DATA

BACKGROUND

The preferred embodiment concerns a method and a device for printing of sensitive data.

Different methods are known for transmission of sensitive data to a printing device for printing of these data. For example, a system and a method in which an authorized person at a printing device must authenticate himself via input of a PIN before the respective printing process is executed arises from U.S. Pat. No. 5,633,932. It is here assumed that the authorized person is present next to the printing device and can monitor the printing process during the printing process. The data to be printed are transmitted encrypted to the printing device and, as soon as the authentication has been effected by the authorized person, they are decrypted in the printer and stored in a print queue for processing. This method is very appropriate for small print jobs that are respectively monitored and executed by a specific person. When larger print jobs are executed at a printing device, the danger exists that an authorized person routinely authenticates himself without the necessary care being taken in the individual case. The function of the security device can thus be eliminated. Additionally, the encrypted data are stored in a readable format in the print queue in the printing device such that the printing device can be specifically manipulated and the sensitive data can be extracted.

A method similar to this is described in EP 1 091 285 A2, in which an authorized person has to authenticate himself at a printing device so that the print job is executed. The authentication thus occurs by means of a smart card.

A printing device that comprises a decoder module with which coded data can be decoded or decrypted arises from the US published patent application US 2001/0037462 A1. The encrypted data are transmitted to a driver device for printout on a recording medium. The driver device converts the decrypted print data into control signals for activation of a print head of the printing device.

In the printing of sensitive data such as, for example, the PIN for check cards or credit cards, a print file that contains the sensitive data is initially created and this file is encrypted. This process occurs in a security zone, i.e. in a hermetically sealed room on a computer system that can be separated from further networks during the operation, such that it is ensured that no unauthorized third parties can access the data to be processed. The print file so created is, for example, transferred onto a printing device with a data medium. The printout in turn occurs in a hermetically sealed room since, in the known printing devices, the encrypted data are decrypted and exist in a readable, decrypted form in the printing device. It is therefore necessary that, during the printing process, only a few authorized persons have access to the device and that the room in which the printing device is located is sealed. However, this also has the consequence that a print job with sensitive print data cannot simply be executed between two print jobs that merely contain non-sensitive data since extensive security measures must be taken for printing of the sensitive data. This applies even when the data are printed on a recording medium given which the printed data cannot be read after the printing process without destroying a casing, a seal, or a corresponding other security mechanism. Such recording media are, for example, envelopes with an insert sheet that can be mechanically printed from the outside. Recording media with a security mechanism that makes a reading of sensitive data impossible without detectable alteration of the security mechanism are designated in the following as safety paper. Furthermore, safety paper is developed that can not just be mechanically printed but can also be printed with an electrophotographic printing device.

US 2002/0032703 A1 discloses a printing in which confidential data are buffered on a fixed disc. After a successful printing of the data, these data on the fixed disc are deleted again, whereby the confidential handling of the data should be assured.

A network system that comprises a printer arises from EP 0 858 021 A2. Confidential print jobs are secured by a PIN. In order that a confidential print job is printed by a printer, a user must input the PIN at the printer such that he can ensure that the print copy does not arrive at unauthorized hands.

A similar network system is known from U.S. Pat. No. 5,633,932, in which the print jobs must also be authenticated before the printout.

Since, in the known printing devices, the encrypted data is present in readable form in the printer, it is not possible to execute a print job of such sensitive data without hermetic sealing of the printing device.

A significant requirement exists for a printing device with which sensitive data can be printed without the printing device having to be hermetically sealed for printout of the data.

A printer that is provided for printout of sensitive data arises from US 2002/0184495. This printer comprises a device with which it is determined whether received data to be printed are stored in a volatile or non-volatile memory. If the data should be stored in a non-volatile memory, it is assessed whether they are sensitive data that are then encrypted before they are stored on the non-volatile memory. If the data are stored in the volatile storage medium, an encryption is not necessary since the data are lost given a theft of the printer or of the storage medium.

If sensitive data should be printed in large quantities, it is thus appropriate to use an electrophotographic printing device because corresponding high-capacity printers offer a high throughput, whereby every single page can be printed individually. In electrophotographic printers, a character generator is activated by means of a controller, which character generator exposes (with a laser or with light-emitting diodes) a photoconductor drum with which ink particles are transferred onto a recording medium. In "Das Druckerbuch—Technik und Technologien der OPS-Hochleistungsdrucker, edition 5a, October 2000, ISBN-3-00-001019-X, such optical character generators are described in chapter 4 and a corresponding controller (the SRA controller) for activation of character generators is described in chapter 9. Raster techniques and their effect on the print quality are explained in chapter 6.

SUMMARY

It is an object to achieve a method and device for printing of sensitive data given the execution of which on a printing device it is not necessary to seal the printing device.

In a method and system for printing of sensitive data, encrypted sensitive data to be printed is transferred to a printing device having a printing unit. This sensitive data to be printed is decrypted to create decrypted sensitive data. The decrypted sensitive data is converted into control signals for activation of the printing unit. The decrypted sensitive data is stored in a non-volatile memory such that the decrypted sensitive data are distributed in a plurality of memory segments of the non-volatile memory where a relationship of the memory segments is stored as relationship data independently of the stored decrypted sensitive data. The decrypted sensitive data is printed with the printing unit on a recording medium.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

In the preferred embodiment, the method for printing sensitive data comprises the steps of:

encryption at a workstation of sensitive data to be printed,
transfer to a printing device of the data to be printed,
decryption of the sensitive data to be printed,
conversion of the data to be printed into control signals for activation of a printing unit, and
printing of the data on a recording medium, where the decrypted data are not stored in a readable format on a non-volatile storage medium between the decryption and the printing of the data.

Sensitive data in the sense of the present preferred embodiment are all confidential or secret data, in particular top secret data that are made accessible only to strictly limited personnel circles under significant security requirements.

A non-volatile storage medium in the sense of the present preferred embodiment is any storage medium that retains the stored data over an unlimited time duration. In contrast to this, a volatile storage medium in the sense of the present preferred embodiment is a storage medium that loses the data immediately as soon as the current feed of the storage medium is ceased.

Since, according to the preferred embodiment, the data to be printed after the encryption are not stored in a readable format on a non-volatile storage medium, during the processing in a printing device the sensitive data are not present in a readable format. Even if it is sought during the printing process to manipulate the printing device such that it is halted, the sensitive data stored in the volatile memory are automatically deleted and, in the event that the sensitive data are stored on a non-volatile storage medium, they are stored in a non-readable format such that they cannot be read.

By non-readable form, what is understood in the sense of the preferred embodiment is any format that cannot be read without further information that is inaccessible. For example, it is known that operating systems distribute certain data units in a fragmented manner in segments on a storage medium. However, these segments are only readable when the corresponding information for assembly of the segments exists. However, this information is inaccessible in most operating systems since it is stored at a point unknown to the user. In the present preferred embodiment, it is appropriate to store this information in a volatile memory such that, given a manipulation, this information is lost and the data stored on the non-volatile storage medium is no longer readable.

The preferred embodiment thus makes it impossible to extract (via manipulation at the printing device) the data (supplied encrypted to the printing device from the printing device) during the working process of the decryption up to the printing on the recording medium. It is thus no longer necessary to arrange the printing device in a hermetically-sealed room upon printing of sensitive data, and print jobs with sensitive data and print jobs with non-sensitive data that can be placed by any persons can be executed in series on the printing device.

The conversion of the data to be printed into control signals occurs in electrophotographic high-capacity printers for which the method is provided via a known rastering of the data to be printed into raster images which represent the control signals for a character generator. In the method, the decryption of the sensitive data and the rastering of the same are advantageously executed in immediate succession, and the printing process is executed immediately following the rastering.

In a further preferred embodiment, sensitive and non-sensitive data are arranged mixed in a data unit (in particular a print file) before the transfer to the printing device, whereby the sensitive data are characterized by markings. It is thus possible that the sensitive data can be processed independent of the non-sensitive data upon generation of a print file, such that, for example, an elaborate and extensive layout of any persons without security requirements can be created into which the sensitive data generated under high security requirements are then inserted in encrypted form. Since the data set of the sensitive data is normally significantly less in comparison to the data set of the non-sensitive data, the expenditure for the requirements of security can be kept low. This combination of sensitive data and non-sensitive data in one printing unit represents an independent idea.

Figure 1:
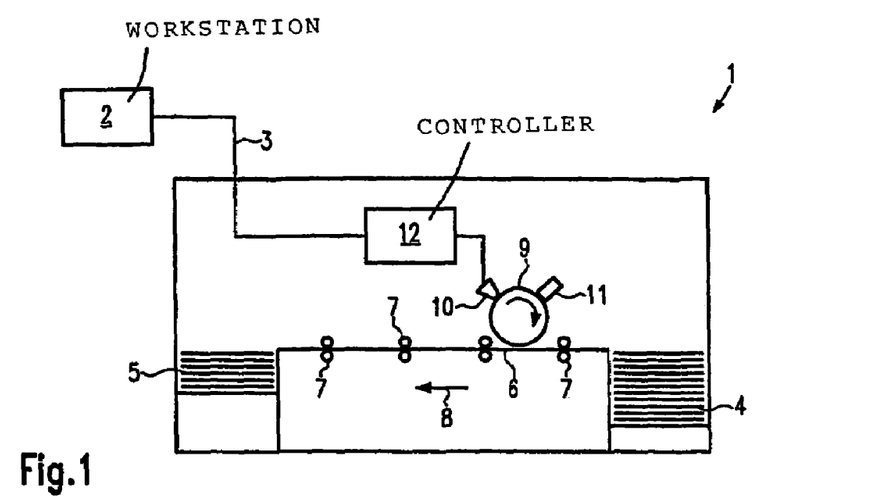
FIG. 1 shows a workstation and a printing device for execution of the method of the preferred embodiment.

FIG. 1 shows a system for execution of the method of the preferred embodiment. This system comprises a printing device 1 that is connected with a workstation 2 via a data line 3.

A print file can be created at the workstation 2, which print file is conducted via the data line 3 to the printing device 1.

The printing device 1 comprises an input tray 4 to receive a stack of unprinted recording media and an output tray 5 in which printed recording media are stored. A transport path 6 for transport of the recording media is formed between the input tray 4 and the output tray 5. In FIG. 1, this transport path 6 is schematically shown and delimited by transport rollers 7. The recording media are conveyed in the transport direction 8 by means of the transport rollers.

A photoconductor drum 9 is arranged abutting on the transport path 6. The photoconductor drum 9 is exposed by means of an LED character generator and, corresponding to the exposure of the photoconductor drum, ink particles are received by this at a developer station 11 and transferred onto the recording media. The character generator 10 is controlled by a control 12.

The character generator 10, the photoconductor drum 9 and the developer station 11 form a printing unit.

The printing device 1 is schematically shown roughly simplified in FIG. 1, whereby known elements that are necessary for the operation of the printing device (such as, for example, the fixer unit) have been omitted since they are without relevance for the preferred embodiment.

A print file is generated at the workstation 2 and this print file is transferred to the printing device 1 via the data line 3. The print file is thus, for example, transmitted in the form of a print data stream (for example IPDS, PDF, PS, PCL). The controller 12 receives the print data stream and executes a pre-processing in which the print data stream is converted into an intermediate language (for example meta-command list or display list).

Figure 2:
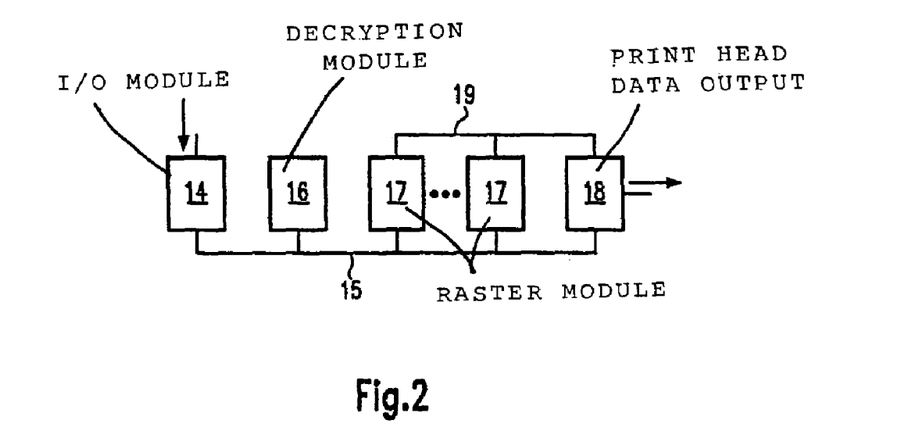
FIG. 2 shows schematically the design of a controller of the printing device from FIG. 1.

In the controller 12, the print data are converted into control signals for activation of the character generator 10. In electrophotographic high-capacity printers, this conversion of the print data occurs via a rastering, whereby the control signals are raster images whose pixels directly activate individual LEDs of the character generator 10.

On the input side, the controller 12 comprises an I/O module 14 for receipt of the print data. The I/O module 14 is coupled to a data bus such as, for example, the MultibusII® 15. Coupled to this data bus 15 are a decryption module 16 and one or more raster modules 17 as well as a print head data output 18 (that is also designated as a serializer). The raster module or modules 17 and the print head data output 18 are connected with one another via a pixel bus 19 via which the rastered print data are transferred. The rastered print data are forwarded to the character generator 10 at the print head data output 18.

A first embodiment of the method is subsequently explained using FIG. 3.

Two data sets (data set 1 and data set 2) here exist, whereby the data of the one data set (data set 1) contain non-sensitive data and the data of the other data set (data set 2) contain sensitive data. The data set with the sensitive data is encrypted. Together both data sets form the print data.

The generation and processing of the data set containing the sensitive data occurs in a hermetically-sealed room. The data set is also encrypted.

After the encryption, the data set containing the sensitive data can be provided with the data set containing the non-sensitive data for print data. These print data are processed at the workstation 2 by means of a suitable application software (for example OCE-Documentdesigner or a text processing program), whereby an application description or a layout is initially worked out from the unencrypted data set, whereby regions are provided for accommodation of encrypted data that are marked by means of markings or commands. In principle, any type of command or marking can be used insofar as the markings/commands can be clearly interpreted in subsequent processing steps. In particular parameters, flags or tags, particular write commands and visible or non-visible identifiers (such as, for example, colors or fonts) are possible.

In the next processing step at the workstation 2, the print file is formatted on the basis of the application description and the available print data. This occurs by means of special formatters such as, for example, PRISMAproduction or OCE-Windows-Application-Driver. It is significant that the encrypted data are not decrypted but rather are inserted into the print file as encrypted data sets.

The generation of the print file thus on the one hand comprises the typical layout and text processing and the insertion of the encrypted data set into predetermined regions of the unencrypted data set. The encrypted regions are marked in the print file with suitable markers.

The print file in the form of a print data stream is forwarded to the printing device 1 via the data line 3.

Here the print data stream is received by the I/O module 14 of the controller 12 and fed into the data bus 15. The decryption module 16 reads the print data and detects the encrypted print data using the markings.

The encrypted print data are decrypted by the decryption module 16 at the request of the raster modules 17. The print data so decrypted are rastered by the raster modules 17 according to known raster techniques. The raster images thus generated are forwarded to the print head data output 18 via the pixel bus 19.

The print head data output 18 forwards the raster image to the character generator 10 which controls (corresponding to the print data) the printing process onto a recording medium.

A recording medium in which the sensitive data cannot be read without destruction of a seal or envelope is advantageously used as a recording medium.

Alternatively, in the framework of the preferred embodiment it is also possible to output the raster images in electronic form, for example as a file, e-mail, fax or the like. However, since they contain sensitive data, given such output it is necessary to encrypt them so that they can be forwarded to third parties.

In the above system, the decrypted data are present only in the region comprising the data bus 15, the pixel bus 19 and the data line between the print head data output 19 and the character generator 10. There is no non-volatile memory in this region. There is also no data unit between the decryption module 16 and the print head data output 18 that comprises and can read a data set containing larger, decrypted data.

The decryption module 16 stands in relationship to the raster modules 17 similar to the relationship of a coprocessor to a processor, meaning that the raster modules 17 transmit the encrypted information to the decryption module 16 for decryption and promptly retrieve the decrypted data again. The data are not buffered but rather are converted by the raster modules into control signals for activation of a printing device.

In the printing device according to the present exemplary embodiment, the memory is virtually administered and each page is re-allocated as needed. The encrypted data and the decrypted control signals can therefore not be correlated even upon direct reading of the memory. The memory pages or (that are normally 4 kilobytes in size) are administered by a separate program and are distributed on different raster modules. The corresponding linking information is not accessible from the outside. The format is machine-specific, meaning that it also cannot be interpreted without additional detailed knowledge. Additionally, no memory dump can be executed with the present embodiment of the printing device, meaning that the memory cannot be read by a third party. Additional software would have to be introduced for this. However, such interruptions and manipulations are registered by the controller.

It is thus not possible to arrive at the sensitive data via stopping the printing device and reading out the memory modules in this region. The memory modules of the raster module 17 respectively contain only segments of the print data, such that their association is practically impossible.

The decryption module 16 can be selected by the operator of the printing device himself and be added at a corresponding slot via insertion. Such decryption modules are typically designed such that they automatically self-destruct given mechanical interference. In the framework of the preferred embodiment, it can also be appropriate to correspondingly design the raster modules 17 and the print head data output 18.

It can also be appropriate that the decryption module is to be activated by one or more keys, such that it is ensured that the printing device only prints sensitive data when one or more specific operators are physically present. These keys can, for example, be input at the printing device 1 via a control panel on the printing device or via a data medium such as, for example, a chip card.

Furthermore, it is appropriate to correspondingly identify safety paper inserted into the input tray 4 via an input on the control panel, whereby an operator may execute this only under prior authentication by means of a key. It is thus ensured that sensitive data are only printed on corresponding recording media.

Alternatively, it is possible to provide a sensor to detect a corresponding safety paper on the transport path 6 in the region before the photoconductor drum 9, such that the printing process of sensitive data is automatically stopped if only a conventional recording medium should have been supplied to it.

In the above exemplary embodiment, a decryption module 16 and one or more raster modules 17 are provided. In the framework of the preferred embodiment, it is also possible to link the calculations for decryption of the encrypted data with the calculations for rastering of print data and to execute them in a combined decryption/raster module.

Figure 3:
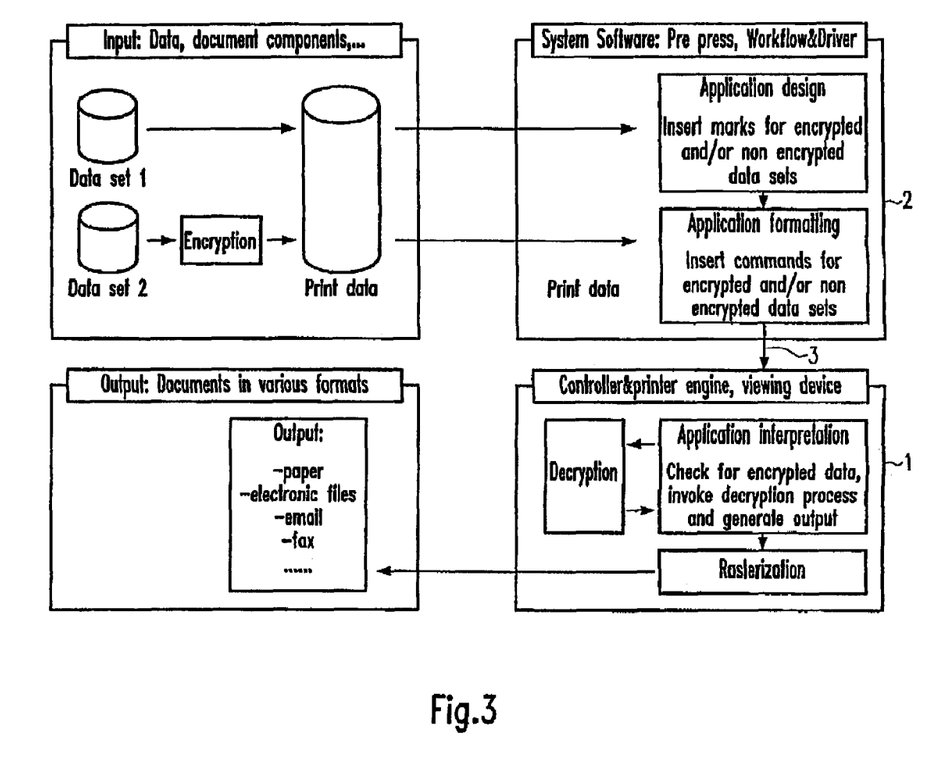
FIG. 3-FIG. 6 show respectively, schematically, an embodiment of the method of the preferred embodiment in a block diagram.
Figure 4:
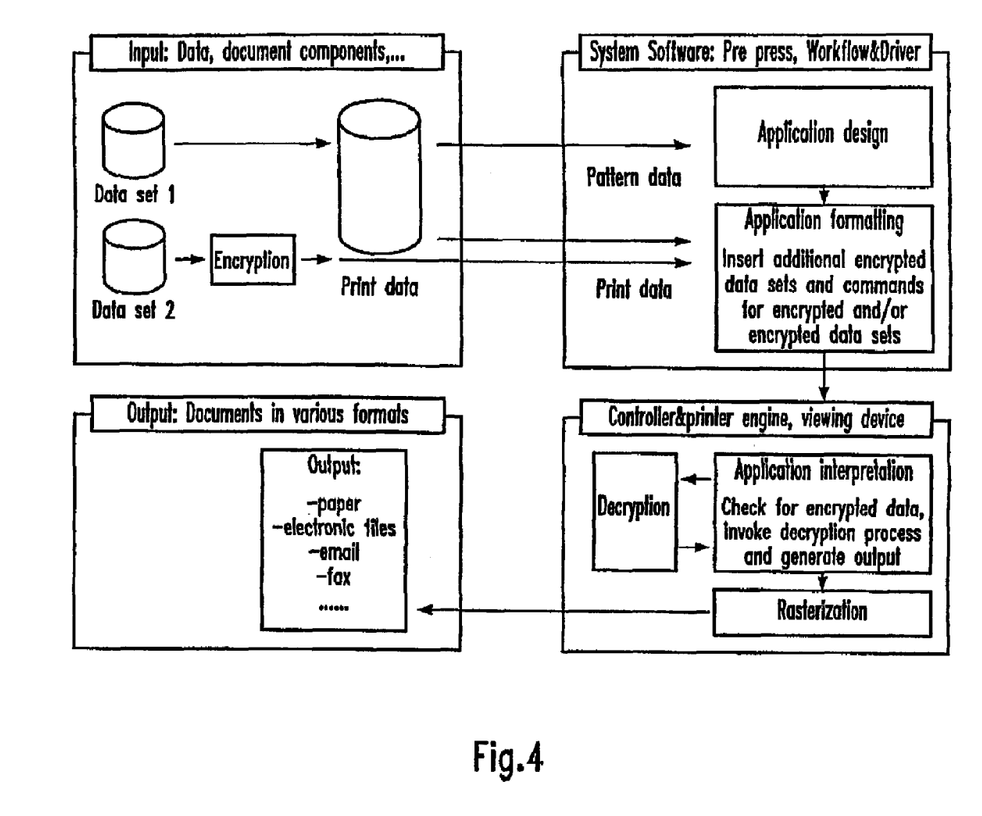

The embodiment of the method according to FIG. 4 essentially corresponds to that from FIG. 3. These differ merely in the design and in the formatting of the application. In the application description (layout), only the unencrypted data are considered. Corresponding blank areas are to be provided for the encrypted data.

These blank areas for the encrypted data can be generated via placeholders in order to be able to visualize the complete design. For this it is appropriate to use suitable markings. Additionally, the marking can also be used as a "positioning or formatting aid".

In the formatting of the application, the application is formatted on the basis of the application description (layout) and the available print data. This can be executed by means of special formatters such as, for example, PRISMAproduction or OCE-Windows-Application-Driver.

Figure 5:
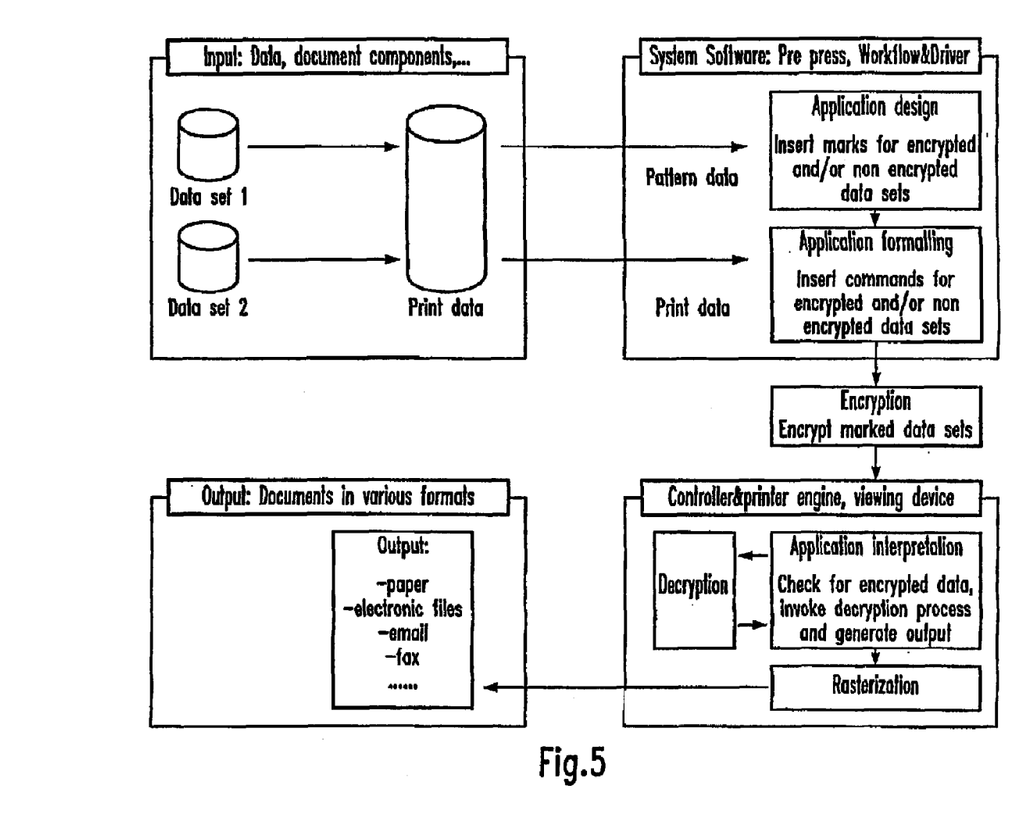

In the embodiment of the method according to FIG. 5, in comparison with the embodiment from FIG. 3 there are differences in the design of the print process and in the formatting and encryption of the application. In particular the data to be encrypted are only selectively encrypted after the generation of the print application or print file.

In the application description (layout), the sensitive and the non-sensitive data are characterized by separate marking. In principle, any type of command or marking can be used insofar as it can be clearly interpreted in the next processing stages. In particular parameters, flags or tags, (write) commands or visible or non-visible identifiers (such as, for example, color or fonts) can be used for this.

Figure 6:
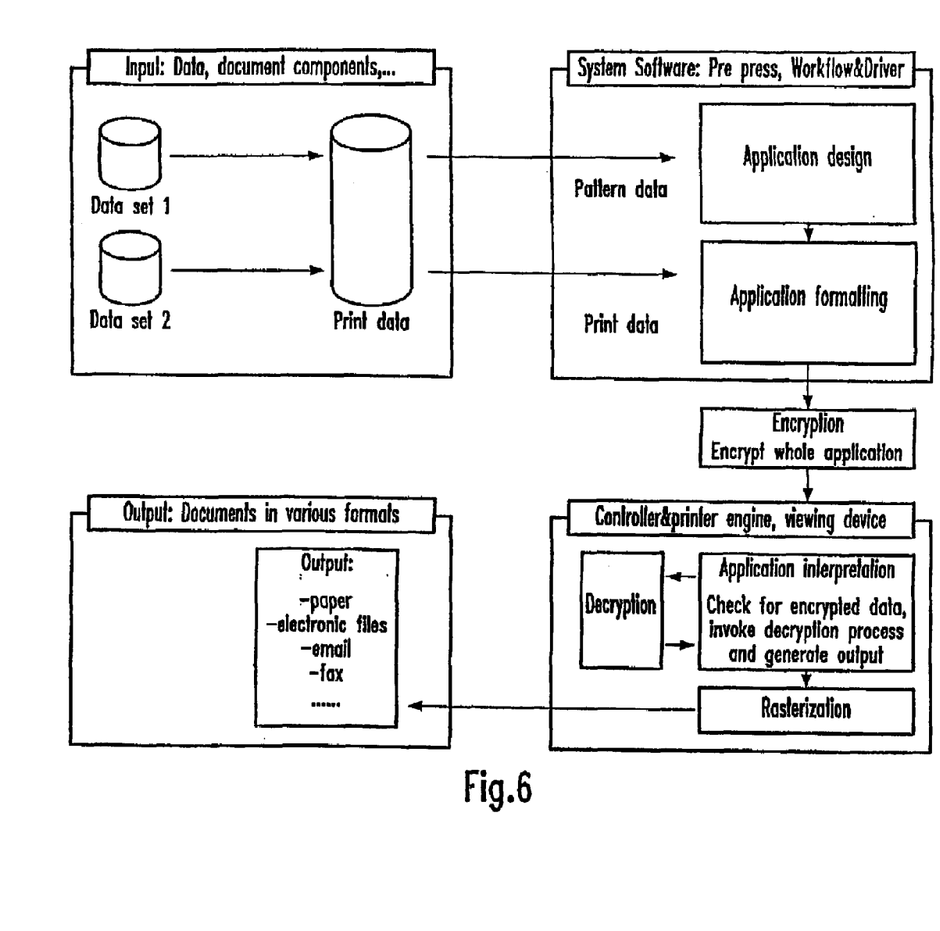

The embodiment of the method shown in FIG. 6 significantly corresponds to the embodiment shown in FIG. 5, whereby, however, neither commands nor markings for identification of the encrypted data are placed in the design of the application and in the formatting of the application; rather, the entire application or print files are encrypted.

The printing device used in the above embodiment is an electrophotographic high-capacity printer. Such high-capacity printers can print 400 DIN 4 pages per minute and more.

The preferred embodiment can be summarized in brief according to the following:

The preferred embodiment concerns a method and a device for printing of sensitive data. The data are not held in a non-volatile memory after the decryption in the printing device; rather, they are immediately converted into control signals for activation of a printing unit and forwarded to the printing unit substantially without buffering.

It is thus not possible to read the decrypted data via manipulation at the printing device.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for printing of sensitive data, comprising the steps of:
    at a workstation encrypting the sensitive data to be printed;
    transferring the encrypted sensitive data to be printed along with non-sensitive data to be printed to a printing device having a printing unit;
    decrypting the sensitive data to be printed to create decrypted sensitive data and in immediate temporal succession converting the decrypted sensitive data to be printed into control signals for activation of the printing unit via rastering of the data into one or more raster images representing the control signals;
    storing the decrypted sensitive data in a non-volatile memory such that the decrypted sensitive data are distributed in a plurality of memory segments of the non-volatile memory, and storing a relationship of the memory segments in said non-volatile memory in a volatile memory as relationship data independently of the stored decrypted sensitive data so that without said relationship data, the decrypted sensitive data stored in said memory segments is not readable; and
    printing the non-sensitive data, and also printing the decrypted sensitive data based on the relationship data, with the printing unit on a recording medium.

2. The method according to claim 1 wherein the decryption and the conversion into control signals is executed in a controller for activation of a character generator.

3. The method according to claim 1 wherein the print data to be printed are transferred to the printing device in the form of a print data stream, the print data stream being converted into an intermediate language in the printing device, and the print data being converted into the control signals.

4. The method according to claim 1 wherein the sensitive data and the non- sensitive data are connected into one data unit before transfer to the printing device.

5. The method according to claim 1 wherein the sensitive data are identified in the data unit via markings.

6. The method according to claim 4 wherein a layout that comprises regions to receive sensitive data is generated using the non-sensitive data.

7. The method according to claim 4 wherein the sensitive data are already encrypted before combination with the non-sensitive data into said one data unit.

8. The method according to claim 1 wherein the sensitive data are encrypted after combination with the non-sensitive data into said one data unit.

9. A system for printing sensitive data which have been encrypted, comprising:
    a printing device having a printing unit connected to a controller, said controller receiving said encrypted sensitive data along with non-sensitive data;
    said controller comprising a decryption module, a non-volatile memory, a relationship data volatile memory, and a converter which converts decrypted sensitive data from said decryption module in immediate temporal succession into control signals for activation of said printing unit, said control signals activating the printing unit via rastering of the data into one or more raster images reprinting the control signals; and said controller storing the decrypted sensitive data in said non-volatile memory such that the decrypted sensitive data are distributed in a plurality of memory segments of the non-volatile memory, and storing a relationship of the memory segments in said non-volatile memory in said relationship data volatile memory as relationship data independently of the stored decrypted sensitive data so that without said relationship data, the decrypted sensitive data stored in said memory segments is not readable.

10. The system according to claim 9 wherein the printing unit comprises a character generator.

11. The system according to claim 9 wherein the controller comprises at least one raster module as said converter.

12. The system according to claim 9 wherein the controller comprises a combined decryption and raster module.

13. The system according to claim 9 wherein a sensor for detection of recording media with predetermined security features is arranged on a transport path for recording media in a region before the printing unit such that the printing of the sensitive data can be stopped given detection of recording media without security features.

* * * * *